C. O. THORSON.
EVENER ATTACHMENT.
APPLICATION FILED OCT. 6, 1909.

1,038,463.

Patented Sept. 10, 1912.

Witnesses
L. B. James
L. N. Gillis

Inventor
Carl O. Thorson
By Chandler & Chandler
Attorneys

COLUMBIA PLANOGRAPH CO., WASHINGTON, D. C.

ically set forth in the claim.

UNITED STATES PATENT OFFICE.

CARL O. THORSON, OF BANCROFT, IOWA.

EVENER ATTACHMENT.

1,038,463.  Specification of Letters Patent.  Patented Sept. 10, 1912.

Application filed October 6, 1909. Serial No. 521,215.

*To all whom it may concern:*

Be it known that I, CARL O. THORSON, a citizen of the United States, residing at Bancroft, in the county of Kossuth, State of Iowa, have invented certain new and useful Improvements in Evener Attachments; and I do hereby declare the following to be a full, clear, and exact description of the invention, such as will enable others skilled in the art to which it appertains to make and use the same.

This invention relates to draft devices and has special reference to an attachment for fastening a plow and evener together.

It is a well understood fact that sulky and gang plows are usually drawn by four horses and that one of the horses walks in the last turned furrow while the remainder walk on the land. This arrangement necessitates an evener of special design in order to overcome the tendency of the plow to bite into the land.

The principal object of the present invention is to provide a means whereby the ordinary form of four horse evener may be attached to a plow in such manner that the tendency to bite into the land will be overcome. In carrying out this object there is provided an attachment arranged to draw the plow straight ahead in the direction of movement of the evener.

The invention consists in general of a Z-shaped main member provided adjacent the end of one limb of the Z with means for attachment of an evener and adjacent the end of the other limb with means for attachment to a flat clevis, and a brace extending from one limb to the other across the body of the Z.

The invention further consists in certain novel details of construction and combinations of parts hereinafter fully described, illustrated in the accompanying drawings, and specifically set forth in the claim.

Figure 2:
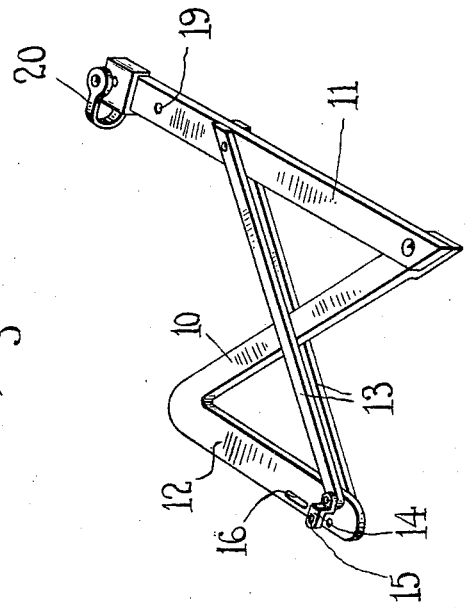
Figure 1:
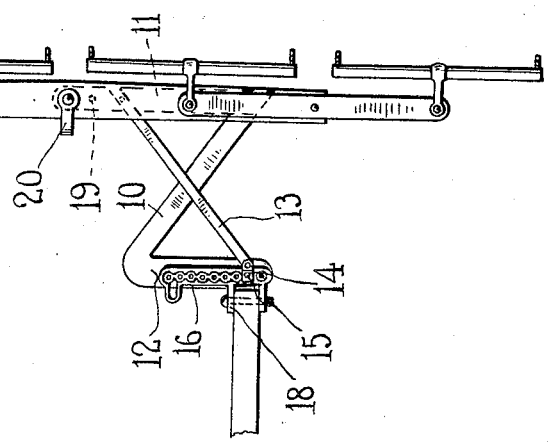

In the accompanying drawings, like characters of reference indicate like parts in the several views, and Figure 1 is a plan view of the device as applied to a plow and having an evener secured thereto. Fig. 2 is a detail perspective showing the device without the evener but showing the manner in which the flat plow clevis is attached.

The numeral 10 indicates the body of a Z-shaped main member and this member is provided with what may be termed a forward limb 11 and a rear limb 12. In the present instance the forward limb 11 is shown as riveted to the body 10 but any other suitable means of securing may be adopted as is deemed necessary.

Extending across the body 10 from one limb to the other are braces 13 which are firmly secured to both of the limbs and at the rear end of these braces is a perforated clip 14 and the rear limb is likewise provided with a suitable perforation immediately below the perforation in the clip, the two perforations being for the purpose of receiving a securing bolt 15. The rear limb is furthermore slotted as at 16 to receive a securing bolt 17.

At 18 is indicated a plow clevis of the flat type, the clevis consisting of a casting provided with a series of perforations in the usual manner and the securing bolts 15 and 17 pass through two of the perforations in the clevis 18 and through the previously described perforations in the rear limb 12. The slot 16 is provided so that no matter what the distance between the perforations in the clevis the same may be applied to the rear member and the rear member thus fastened rigidly to the plow.

The forward limb 11 is provided with suitable perforations as indicated at 19 for the purpose of receiving an evener attaching clevis 20 to which, when in use, an evener 21 of the ordinary type is secured. When a sulky plow is used the outer of the perforations 19 is used for attachment while when a gang plow is used the inner is utilized for the purpose of attachment.

When the device has been applied as indicated in Fig. 1 it will be seen that the evener is secured to the rigidly braced frame which in turn is rigidly secured to the plow and that the point of attachment is offset toward the landside of the plow.

By forming the arm 11 longer than the arm 12, the four-horse evener 21 is held over to the left several inches, and yet has a straight draft from the clevis of the plow 18.

There has thus been provided a simple and efficient device of the kind described and for the purpose specified.

Having thus described the invention, what is claimed as new, is:—

An evener attachment comprising a rigid frame consisting of spaced parallel limbs and a diagonal connection, one of said limbs being shorter than the other and formed near its free end with an aperture and an elongated opening adapted to respectively register with certain openings of a clevis, a brace extending across the diagonal connection and having one end connected to the free end of the shorter limb and having its other end connected to the longer limb intermediate the ends thereof, a clip connected to the free end of the shorter limb and formed with an opening which registers with the opening of the shorter limb for receiving an attaching bolt, said clip and the adjacent end of the brace being connected to the shorter limb by a common fastening means, and an attaching clevis secured to the free end of the longer limb of the frame.

In testimony whereof, I affix my signature, in presence of two witnesses.

CARL O. THORSON.

Witnesses:
CHAS. NELSON,
EDWIN A. HOWE.

Copies of this patent may be obtained for five cents each, by addressing the "Commissioner of Patents, Washington, D. C."